US012811287B2

(12) United States Patent
Shen et al.

(10) Patent No.: US 12,811,287 B2
(45) Date of Patent: Nov. 24, 2026

(54) DUAL-ANTENNA ELECTRONIC DEVICE AND DECOUPLING METHOD

(71) Applicant: Lenovo (Beijing) Limited, Beijing (CN)

(72) Inventors: Xiaozhun Shen, Beijing (CN); Dafei Mo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 118 days.

(21) Appl. No.: 18/606,615

(22) Filed: Mar. 15, 2024

(65) Prior Publication Data

US 2024/0332789 A1 Oct. 3, 2024

(30) Foreign Application Priority Data

Mar. 31, 2023 (CN) ........................ 202310342000.9

(51) Int. Cl.
*H01Q 1/52* (2006.01)
*H01Q 9/04* (2006.01)
*H01Q 9/42* (2006.01)

(52) U.S. Cl.
CPC ........... *H01Q 1/521* (2013.01); *H01Q 9/0414* (2013.01); *H01Q 9/42* (2013.01)

(58) Field of Classification Search
CPC ........ H01Q 1/521; H01Q 9/0414; H01Q 9/42; H01Q 5/307; H01Q 21/28; H04B 7/0413; H04B 1/0475; H04B 1/10
See application file for complete search history.

(56) References Cited

U.S. PATENT DOCUMENTS

2012/0306718 A1* 12/2012 Koyanagi ................ H01Q 9/42 343/853
2014/0118214 A1* 5/2014 Tanaka .................. H01Q 1/521 343/852
2019/0252770 A1* 8/2019 Thakur .................. H01Q 5/335
2023/0163457 A1* 5/2023 Tsai ....................... H01Q 1/243 343/893
2023/0378635 A1* 11/2023 Kuo ....................... H01Q 5/321

* cited by examiner

*Primary Examiner* — Michael M Bouizza
(74) *Attorney, Agent, or Firm* — ANOVA LAW GROUP, PLLC

(57) ABSTRACT

A dual-antenna electronic device includes: a first antenna, a second antenna, and a decoupling circuit, the first antenna and the second antenna having a plurality of operating frequency bands, the decoupling circuit being configured to generate a decoupling signal corresponding to a current operating frequency band based on the current operating frequency band of the first antenna and/or the second antenna to cancel a coupling signal between the first antenna and the second antenna.

19 Claims, 6 Drawing Sheets

DUAL-ANTENNA ELECTRONIC DEVICE AND DECOUPLING METHOD

CROSS-REFERENCES TO RELATED APPLICATION

This application claims priority to Chinese Patent Application No. 2023103420009 filed on Mar. 31, 2023, the entire content of which is incorporated herein by reference.

FIELD OF TECHNOLOGY

The present disclosure relates to the field of antenna technology and, more specifically, to a dual-antenna electronic device and a decoupling method.

BACKGROUND

With the development of mobile terminal electronic products, the requirements for wireless communication performance have increased. However, due to the thin and lightweight design and metal appearance requirements of the electronic products, the antenna performance will be affected. In addition, due to the space compression of mobile terminal electronic products and the complex structural environment around the antenna, the radiation field pattern has become more directional, resulting in the decrease of the antenna's omnidirectional coverage.

An antenna is often a passive component. After the antenna is designed, its radiation direction and all performance parameters are fixed. If there are many blind spots in the radiation field pattern, it will have a great impact on the overall wireless coverage and user experience of the electronic products.

SUMMARY

One aspect of this disclosure provides a dual-antenna electronic device. The dual-antenna electronic device includes a first antenna, a second antenna, and a decoupling circuit. The first antenna and the second antenna have a plurality of operating frequency bands. The decoupling circuit is configured to generate a decoupling signal corresponding to a current operating frequency band based on the current operating frequency band of the first antenna and/or the second antenna to cancel a coupling signal between the first antenna and the second antenna.

Another aspect of the present disclosure provides a decoupling method for a dual-antenna electronic device. The decoupling method includes obtaining a current operating frequency band of a first antenna and/or a second antenna in the electronic device, based on the current operating frequency band, generating a decoupling signal corresponding to the current operating frequency band to cancel a coupling signal between the first antenna and the second antenna.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

Figure 1:
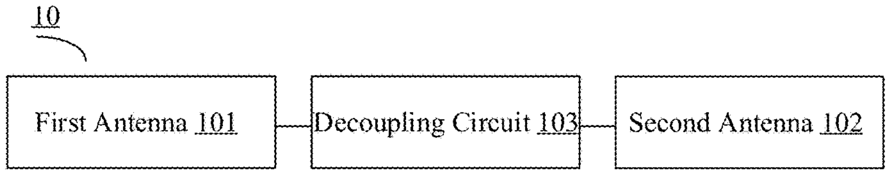
FIG. 1 is a schematic structural diagram of a dual-antenna electronic device according to an embodiment of the present disclosure.

The technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

In the present disclosure, description with reference to the terms "one embodiment," "some embodiments," "example," "specific example," or "some examples," etc., means that specific features described in connection with the embodiment or example, structure, material or feature is included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, as long as they do not conflict with each other.

In the present disclosure, the terms "first," "second," and "third" are only used for descriptive purposes, and should not be understood as indicating or implying relative importance or implying the number of indicated technical features. Thus, a feature described with "first," "second," and "third" may expressly or implicitly include at least one of these features, and the order may be changed according to the actual situations.

Unless otherwise defined, all technical and scientific terms used herein have the same meaning as commonly understood by those skilled in the technical field to which the present disclosure belongs. The terms used herein are only for the purpose of describing the embodiments of the present disclosure, and are not intended to limit the scope of the present disclosure.

Often, after the antenna is designed, its radiation direction and all performance parameters are fixed. If there are many blind spots in the radiation field pattern, the overall wireless coverage and user experience will be greatly impacted. At present, there are relatively few smart antenna solutions. Generally, a grounding unit is added in the near field of the antenna, and different effects of grounding or disconnection of the grounding unit can be controlled to adjust the radiation field pattern to select and maintain the state with optimal signal reception strength by switching between different states and reading the received signal reception strength in real time.

In view of the above, embodiments of the present disclosure provide a dual-antenna electronic device. By adding a decoupling circuit between the antennas and decoupling them by loading inverted signals, a dual-antenna design can be implemented in the electronic devices, which improves the space utilization of the electronic devices. Accordingly, twice the number of antennas can be installed in the same space, making it easier to implement a 4×4 or a multi-antenna communication system (multiple-input multiple-output, MIMO) for transmitting and receiving signals on consumer electronics systems. In addition, the dual-antenna has different antenna directions, which can achieve pattern diversity characteristics and can be used to dynamically adjust the signal-limited transmitting and receiving directions of the antennas. Antenna directions with higher communication quality in any environment can be selected based on signal quality parameters, thereby effectively improving the performance of electronic device antenna systems.

An embodiment of the present disclosure provides a dual-antenna electronic device. FIG. 1 is a schematic structural diagram of a dual-antenna electronic device 10 according to an embodiment of the present disclosure. As shown in FIG. 1, dual-antenna electronic device 10 at least includes a first antenna 101, a second antenna 102, and a decoupling circuit 103. The first antenna 101 and the second antenna 102 may have a plurality of operating frequency bands. The decoupling circuit 103 may be connected to the first antenna 101 and the second antenna 102 respectively, and may be used to generate a decoupling signal corresponding to the current operating frequency band based on the current operating frequency band of the first antenna 101 and/or the second antenna 102 to cancel the coupling signal between the first antenna 101 and the second antenna 102. In this application, cancelling a signal may refer to partially or fully cancelling the signal. In some embodiments, for example, the decoupling signal cancelling the coupling signal may refer to applying the decoupling signal to reduce the coupling signal by certain percentage, or to reduce the coupling signal to a threshold value.

In some embodiments, the decoupling circuit 103 may also achieve signal transmission through coupling with the first antenna 101 and the second antenna 102.

In some embodiments, the first antenna 101 and the second antenna 102 may have a plurality of operating frequency bands. For example, the low operating frequency band may be 2400 to 2500 MHZ (that is, 2.4 to 2.5 GHZ), the medium operating frequency band may be 5.15 to 5.85 GHz, and the high operating frequency band may be the 6E band of 5.925 to 7.125 GHz.

In some embodiments, the first antenna 101 and the second antenna 102 may be inside the dual-antenna electronic device. When the first antenna 101 is in the near radiation field of the second antenna 102, near field coupling will occur, causing a coupling signal to be generated between the first antenna 101 and the second antenna 102. For example, when the first antenna 101 is in the working state, and the second antenna 102 is in the near radiation field of the first antenna 101, near-field coupling occurs between the first antenna 101 and the second antenna 102, resulting in a coupling signal between the first antenna 101 and the second antenna 102. The coupling signals generated by different operating frequency bands may be different.

In some embodiments, the coupling signal may be a coupling current signal generated by the coupling between the first antenna 101 and the second antenna 102. The decoupling signal may be a current signal with the same amplitude and opposite phase as the coupling current signal such that the decoupling signal can cancel the coupling signal between the first antenna 101 and the second antenna 102, thereby improving the isolation between the two antennas through the decoupling circuit.

In some embodiments, the first antenna 101 and the second antenna 102 may be mirror-symmetrically distributed in the electronic device such that the two antennas receive signals and transmit signals in opposite directions. For example, to receive signals from the left side of an electronic device, the first antenna 101 will have a relatively strong reception effect, while the second antenna 102 will have relatively weak receiving capability in the left direction. Similarly, in the right direction, the second antenna 102 will have relatively strong reception effect. Therefore, when the wireless signal is on one side of the electronic device, only one of the first antenna and the second antenna provided in the embodiments of the present disclosure may be in a working state. The current working frequency band may be the working frequency band of the first antenna or the second antenna that is in the working state.

In some embodiments, the operating frequency bands of the first antenna 101 and the second antenna 102 may be the same. When the first antenna 101 is in the working state, such as when transmitting wireless signals, the second antenna 102 may receive part of the wireless signal emitted by the first antenna 101, resulting in near-field coupling between the first antenna 101 and the second antenna 102, causing a coupling signal to appear between the first antenna 101 and the second antenna 102. At this time, both the first antenna 101 and the second antenna 102 are in the working state, and the current operating frequency band may be the operating frequency band of the first antenna 101 and the second antenna 102.

In the embodiments of the present disclosure, the structure of the first antenna 101 and the second antenna 102 may be the same or different. For example, the first antenna 101 and the second antenna 102 may both be inverted F antennas, or the first antenna 101 may be an inverted F antenna and the second antenna 102 may be an inverted L multi-band antenna.

In some embodiments, when the structures of the first antenna 101 and the second antenna 102 are the same, the first antenna 101 and the second antenna 102 may be mirror-symmetrically distributed in the electronic device. The distance between the first antenna 101 and the second antenna 102 may be less than the preset distance. The preset distance may be much smaller than the operating wavelength of the first antenna 101 and the second antenna 102, which causes the coupling energy between the first antenna 101 and the second antenna 102 to be very strong, resulting in a coupling signal. There will be significant interference between the first antenna 101 and the second antenna 102, which will not only cause isolation, but also affect the impedance characteristics of each antenna. Therefore, in the embodiments of the present disclosure, the decoupling circuit 103 between the first antenna 101 and the second antenna 102 can generate a decoupling signal corresponding to the current operating frequency band to cancel the coupling signal between the first antenna 101 and the second antenna 102. Accordingly, effective multi-band isolation between the first antenna 101 and the second antenna 102 can be realized to eliminate the interference between the two antennas and reduce the physical distance requirement between the antennas to zero.

Figure 2:
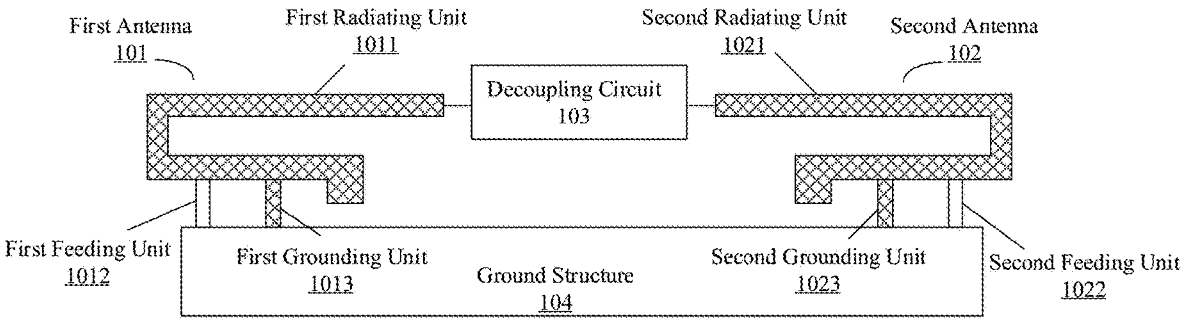
FIG. 2 is a schematic structural diagram of the dual-antenna electronic device according to an embodiment of the present disclosure.

FIG. 2 is a schematic structural diagram of the dual-antenna electronic device according to an embodiment of the present disclosure. As shown in FIG. 2, the dual-antenna electronic device further includes a grounding structure 104. The first antenna 101 and the second antenna 102 may both be inverted F antennas. The first antenna 101 at least includes a first radiating unit 1011, a first feeding unit 1012, and a first grounding unit 1013. The second antenna 102 at least includes a second radiating unit 1021, a second feeding unit 1022, and a second grounding unit 1023. In this embodiment, the feeding units of the dual-antenna are isolated by the grounding units, and by controlling the distance between the two feeding units such that the two feeding units are near the zero point of the current, the interference between the two antennas can be reduced the isolation of the two antennas can be improved.

In some embodiments, in order to realize the miniaturization design of the antenna, the structure of the antenna radiating unit can be optimized. As shown in FIG. 2, the open end of the radiating unit of the antenna can be folded in half to form a U-shaped radiating unit, and a decoupling circuit can be connected to the open end to optimize the isolation of the two antennas (i.e., the coupling between the two antennas). Accordingly, not only does the size of the two antennas provided by the embodiments of the present disclosure in the length direction increase only slightly compared to the single inverted F-shaped antenna, it also greatly improves the space utilization in the electronic device and realizes miniaturized antenna design. In addition, effective isolation between the two antennas at close range can be achieved through a decoupling circuit.

In some embodiments, the grounding structure 104 may include a feeder unit and a grounding unit (not shown in FIG. 2), the grounding unit having a ground potential. The first feeding unit 1012 and the second feeding unit 1022 may be connected to the feeder unit, and the first grounding unit 1013 and the second grounding unit 1023 may be connected to the grounding unit. The first feeding unit 1012 and the first grounding unit 1013 may be respectively connected to the first radiating unit 1011, and the second feeding unit 1022 and the second grounding unit 1023 may be respectively connected to the second radiating unit 1021.

Figure 3:
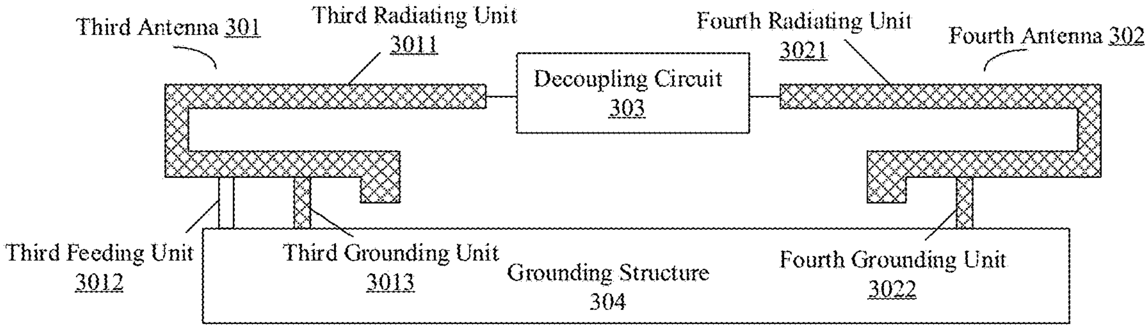
FIG. 3 is a schematic structural diagram of the dual-antenna electronic device according to an embodiment of the present disclosure.

In some embodiments, when the structure of the first antenna 101 and the second antenna 102 are different, the first antenna 101 and the second antenna 102 may also be distributed in the electronic device at a close distance. FIG. 3 is a schematic structural diagram of the dual-antenna electronic device according to an embodiment of the present disclosure. As shown in FIG. 3, a third antenna 301 may be an inverted F antenna, and a fourth antenna 302 may be an inverted L antenna. The third antenna 301 at least includes a third radiating unit 3011, a third feeding unit 3012, and a third grounding unit 3013, and the fourth antenna 302 at least includes a fourth radiating unit 3021 and a fourth grounding unit 3022. The decoupling circuit between the third antenna 301 and the fourth antenna 302 may generated a decoupling signal corresponding to the current operating frequency band based on the current operating frequency band of the third antenna 301 and/or the fourth antenna 302 to cancel the coupling signal between the third antenna 301 and the fourth antenna 302.

In some embodiments, the decoupling circuit may include a decoupling circuit matching each of the plurality of operating frequency bands of the dual-antenna, where each decoupling circuit may generate a decoupling signal corresponding to the matching operating frequency band to cancel the coupling signal generated by the first antenna and the second antenna in the matching operating frequency band. Here, the matching operating frequency band may refer to the operating frequency bands corresponding to different decoupling circuits, that is, different operating frequency bands may correspond to different decoupling circuits.

Figure 4:
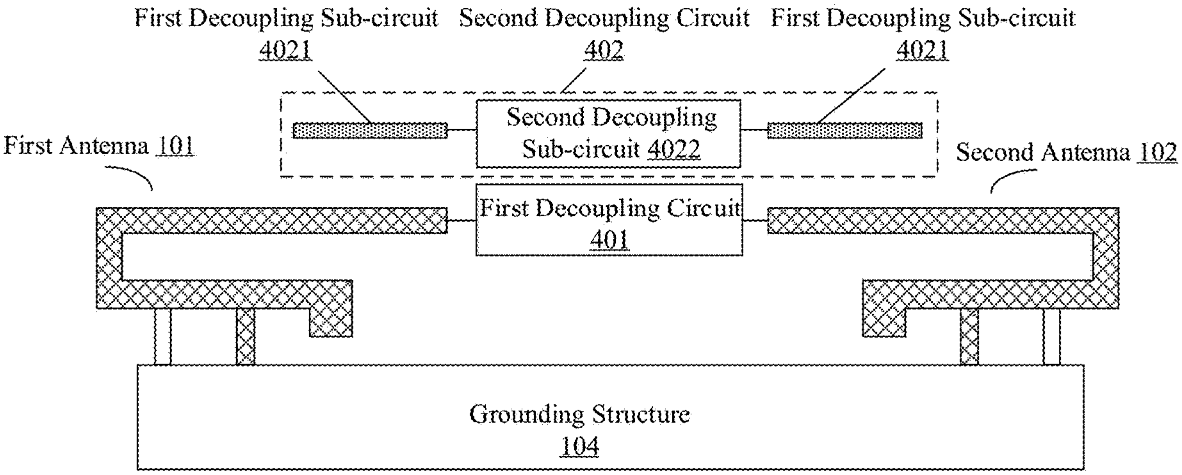
FIG. 4 is a schematic structural diagram of a decoupling circuit according to an embodiment of the present disclosure.

FIG. 4 is a schematic structural diagram of a decoupling circuit according to an embodiment of the present disclosure. As shown in FIG. 4, decoupling circuit 103 includes a first decoupling circuit 401 and a second decoupling circuit 402. The second decoupling circuit 402 includes two first decoupling sub-circuits 4021 and a second decoupling sub-circuit 4022. The second decoupling sub-circuit 4022 is connected to the two first decoupling sub-circuits 4021 respectively. In some embodiments, each first decoupling sub-circuit 4021 may be coupled to the first antenna 101 or the second antenna 102 respectively. That is, there is no direct connection between the fourth radiating unit 3021 and the open-circuit end of the antenna. For high-frequency signals, the first decoupling sub-circuit 4021 and the open end may be coupled within a certain distance to realize signal transmission, resulting in a coupling signal, and the second decoupling sub-circuit 4022 may be used to cancel the coupling signal generated by the second decoupling sub-circuit 4022.

In some embodiments, the dual-antenna structure may include a plurality of second decoupling circuits 402 such that the dual-antenna has more operating frequency bands.

It should be noted that the first decoupling sub-circuit 4021 may achieve indirect feeding through close coupling with the radiating unit of the first antenna or the second antenna. That is, the first decoupling sub-circuit 4021 may be used as a coupling branch of the first antenna and the second antenna such that the first antenna or the second antenna can have multiple operating frequency bands. Take the first antenna as an example, coupling can occur between the first decoupling sub-circuit 4021 and the radiating unit of the first antenna within a certain distance to achieve signal transmission. The shapes and sizes of the first decoupling sub-circuit 4021 and the radiating unit of the first antenna may be different such that the first decoupling sub-circuit 4021 and the radiating unit of the first antenna can be in different operating frequency bands.

Accordingly, when the first antenna is in the first operating frequency band, the first decoupling circuit 401 matching the current first operating frequency band may cancel the coupling signal corresponding to the first operating frequency band between the first radiating unit of the first antenna and the second radiating unit of the second antenna. When the first decoupling sub-circuit 4021 coupled to the first antenna is in the second operating frequency band, the second decoupling sub-circuit 4022 may cancel the coupling signal corresponding to the second operating frequency band between the two first decoupling sub-circuits 4021.

In some embodiments, the first antenna may be in multiple operating frequency bands at the same time, that is, transmitting wireless signals corresponding to different operating frequency bands. Therefore, the first radiating unit of the first antenna and the first decoupling sub-circuit 4021 may transmit signals in different frequency bands at the same time such that the first decoupling circuit 401 and the second decoupling sub-circuit 4022 can generate different decoupling signals at the same time to cancel the different coupling signals between the first antenna and the second antenna to improve the isolation between the first antenna and the second antenna.

Figure 5:
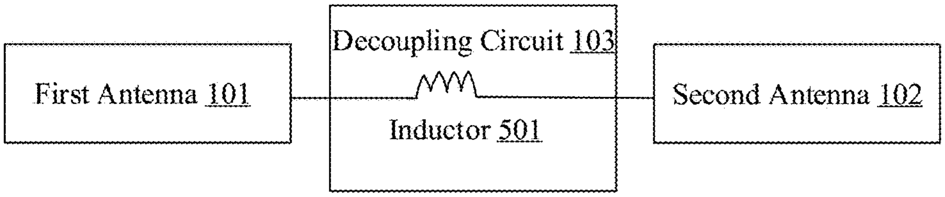
FIG. 5 is a schematic structural diagram of the decoupling circuit according to an embodiment of the present disclosure.

In some embodiments, the decoupling circuit may be composed of microstrips, capacitors, or inductors connected in series and parallel. For example, as shown in FIG. 5, when the first antenna is at 2.4 GHz, the decoupling circuit 103 between the first antenna and the second antenna may be composed of an inductor 501 connected in series between the first antenna and the second antenna. FIG. 5 is a schematic structural diagram of the decoupling circuit according to an embodiment of the present disclosure.

Figure 6:
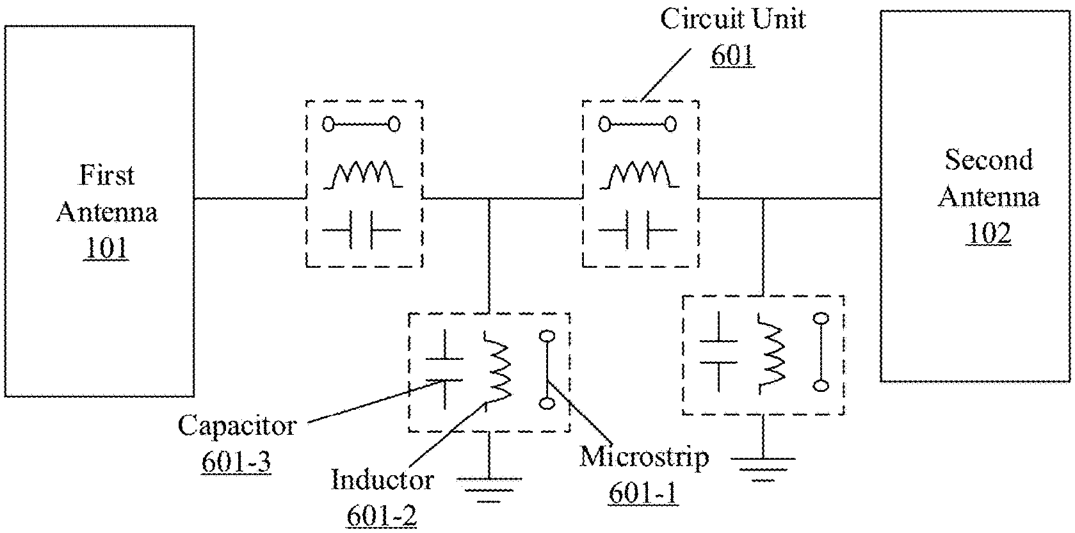
FIG. 6 is a schematic structural diagram of the decoupling circuit according to an embodiment of the present disclosure.

FIG. 4 and the foregoing embodiments provide the use of different decoupling circuits to cancel the coupling signals corresponding to different operating frequency bands. However, in the embodiments of the present disclosure, one decoupling circuit may also be used to cancel the coupling signals corresponding to different operating frequency bands through a control switch. FIG. 6 is a schematic structural diagram of the decoupling circuit according to an embodiment of the present disclosure. As shown in FIG. 6, decoupling circuit 103 is composed of a plurality of circuit units 601. Different circuit units 601 may be connected in series or in parallel. Each circuit unit 601 may include a microstrip 601-1, an inductor 601-2, and a capacitor 601-3 connected in parallel, and a control switch (not shown in FIG. 6) connected to the microstrip 601-1, the inductor 601-2, and the capacitor 601-3 respectively. Here, the control switch may be a single-pole three-throw switch, used to select components for connection between the microstrip 601-1, the inductor 601-2, and the capacitor 601-3 based on the current operating frequency band to realize various structures of the decoupling circuit. Each structure may correspond to one of the multiple operating frequency bands. Decoupling circuits with different structures may generate decoupling signals corresponding to the matching operating frequency band to cancel the coupling signal between the first antenna and the second antenna to achieve multi-band isolation optimization.

In the embodiments of the present disclosure, the microstrips may be used to achieve phase adjustment. The reactance of the microstrip may be $X=0$, the reactance of the capacitor may be $X<0$, and the reactance of the inductor may be $X>0$. In some embodiments, the reactance may refer to the resistance to alternating current.

In some embodiments, due to circuit characteristics, the direct connect network applicable to different frequency bands may only be effective for this frequency band and cannot cover all frequencies. In order to achieve anti-interference optimization in different frequency bands of multi-frequency antennas, in the embodiments of the present disclosure, a decoupling circuit may be placed between the two antennas to obtain a decoupling signal targeting different frequency characteristics, and the decoupling signal may be used to cancel the decoupling signal between the two antennas to optimize the interference between the two antennas.

Figure 7:
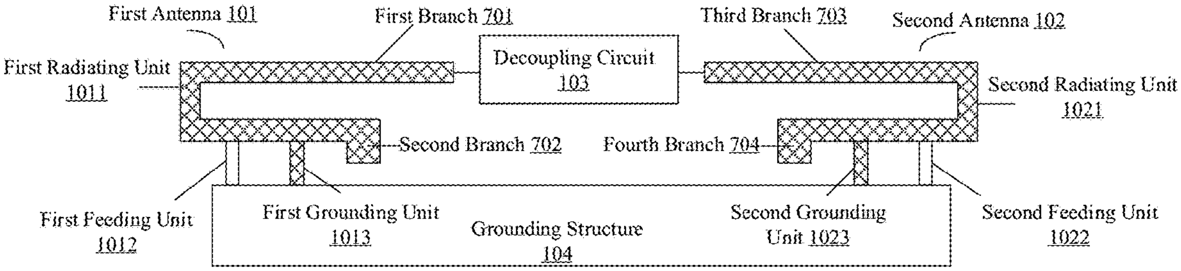
FIG. 7 is a schematic structural diagram of the dual-antenna electronic device according to an embodiment of the present disclosure.

FIG. 7 is a schematic structural diagram of the dual-antenna electronic device according to an embodiment of the present disclosure. In some embodiments, as shown in FIG. 7, the first antenna 101 at least includes a first branch 701 and a second branch 702, and the second antenna 102 at least includes a third branch 703 and a fourth branch 704. That is, the first radiating unit 1011 of the first antenna 101 includes at least the first branch 701 and the second branch 702, and the second radiating unit 1021 of the second antenna 102 includes at least the third branch 703 and the fourth branch 704.

In some embodiments, the first branch 701 and the second branch 702 of the first antenna 101 may have different resonant frequencies such that the first branch 701 and the second branch 702 can be in different operating frequency bands respectively. For example, the first branch 701 may be at 2.4 to 2.5 GHZ, and the second branch 702 may be at 5.15 to 5.85 GHz.

In the embodiments of the present disclosure, the first branch 701 and the third branch 703 may have a third operating frequency band, and the second branch 702 and the fourth branch 704 may have a fourth operating frequency band, the third operating frequency band being different from the fourth operating frequency band. The decoupling circuit may be connected to the second branch 702 and the fourth branch 704 respectively. The decoupling circuit may adopt the decoupling circuit structure shown in FIG. 6 to cancel the coupling signals corresponding to the third operating frequency band or the fourth operating frequency band.

Figure 8:
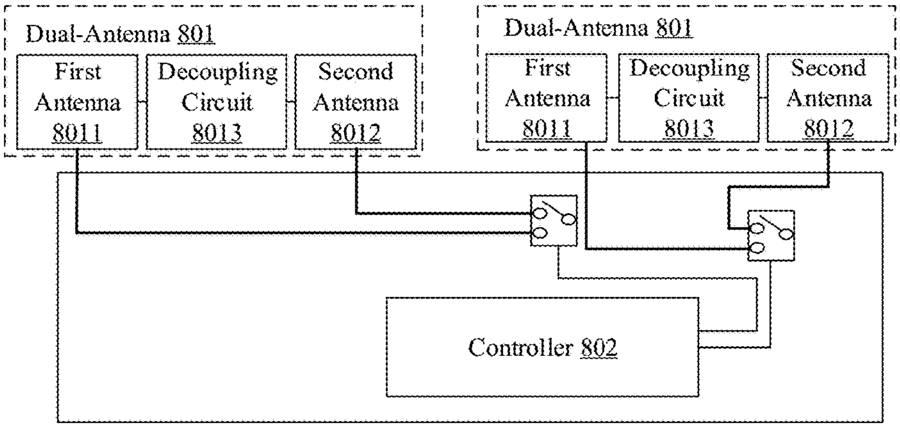
FIG. 8 is a schematic structural diagram of the dual-antenna electronic device according to an embodiment of the present disclosure.

FIG. 8 is a schematic structural diagram of the dual-antenna electronic device according to an embodiment of the present disclosure. In some embodiments, as shown in FIG. 8, the electronic device has at least two sets of dual-antenna 801 and a controller 802, and each set of dual-antenna includes a first antenna 8011, a second antenna 8012, and a decoupling circuit 8013. The controller 802 may be configured to control the first antenna 8011 or the second antenna 8012 in at least one set of the dual-antenna structures to be in a working state based on the signal reception strength of the electronic device and/or the signal direction of the wireless signal.

Figure 9:
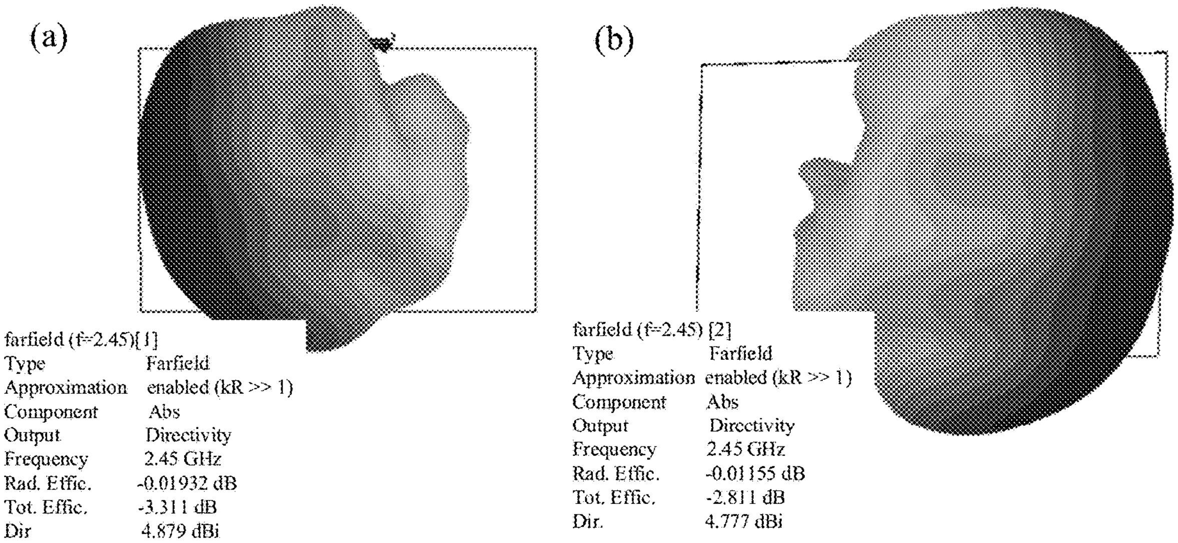
FIG. 9 is a simulated radiation field pattern diagram of the dual-antenna electronic device according to an embodiment of the present disclosure.

In the present disclosure, in order to achieve omnidirectional radiation of the dual-antenna electronic device, the controller may control the first antenna 8011 in the dual-antenna 801 on the left side of FIG. 8 and the second antenna 8012 in the dual-antenna 801 on the right side of FIG. 8 to be in the working state. At this time, the radiation field patter of the dual-antenna electronic device may be as shown in FIG. 9. FIG. 9 is a simulated radiation field pattern diagram of the dual-antenna electronic device according to an embodiment of the present disclosure, where Diagram (a) is the radiation field pattern diagram of the first antenna 8011 in the dual-antenna 801 on the left side of FIG. 8, and Diagram (b) is the radiation field pattern of the second antenna 8012 in the dual-antenna 801 on the right side of FIG. 8. By switching the antenna in the working state through the controller, omnidirectional radiation of wireless signals of dual-antenna electronic device can be achieved.

Based on the dual-antenna electronic device described above, embodiments of the present disclosure further provide a switching method for the dual-antenna electronic device. The execution subject of the method may be a controller of the electronic device. The switching method of the dual-antenna electronic device provided by the embodiments of the present disclosure can be implemented in the following manner.

First, wireless connection parameters of the electronic device may be obtained, the wireless connection parameters including at least signal reception strength and signal direction. Subsequently, in response to the signal reception strength and/or the signal direction meeting a switching condition, control the first antenna or the second antenna in each dual-antenna structure to be in a working state to switch the antenna structure and radiation field pattern of the dual-antenna electronic device.

In the embodiments of the present disclosure, signal reception strength may refer to the receive signal strength indicator (RSSI) of the wireless network card in the electronic device, which can be used to characterize the signal reception strength between the transmitter and the receiver. The signal direction may refer to the direction in which the wireless signals are transmitted and received.

In the embodiments of the present disclosure, the signal reception strength of dual-antenna electronic devices under different antenna structure can be obtained, and the antenna structure with higher signal reception strength can be selected as the current structure for receiving or transmitting wireless signals to achieve optimal performance of dual-antenna electronic devices.

In some embodiments, detection and comparison of wireless signal reception strengths under different antenna structures of the electronic device may be performed. The comparison may be performed in real time such that the wireless performance of the electronic device can be maintained at the optimal state. Alternatively, the comparison may be performed at a preset period of time, as each preset period of time passes, the signal reception strengths corresponding to different antennas in the current electronic device may be detected, which reduces the amount of calculation of the controller while maintaining the wireless performance of the electronic device.

In some embodiments, the signal direction of the wireless signal may be detected in real time, and the first antenna or the second antenna in each dual-antenna structure may be controlled to be in the working state based on the signal direction to maintain optimal performance of the dual-antenna electronic device.

Consistent with the present disclosure, by detecting the wireless signal reception strength and the signal direction of the electronic device, the antenna structure and radiation field pattern can be automatically adjusted, allowing the electronic device to maintain optimal wireless performance, thereby effectively improving wireless connection performance in complex environments.

Embodiments of the present disclosure further provide a decoupling method for the dual-antenna electronic device. The execution subject of the method may be a controller of the electronic device. The switching method of the dual-antenna electronic device provided by the embodiments of the present disclosure can be implemented in the following manner.

First, the current operating frequency band of the electronic device may be obtained. Subsequently, based on the current operating frequency band, a decoupling signal corresponding to the current operating frequency band may be generated to cancel the coupling signal between the first antenna and the second antenna.

Consistent with the present disclosure, in the dual-antenna electronic device, the coupling signal between the first antenna and the second antenna can be cancel through the decoupling circuit between the two antennas. Accordingly, the mutual interference between the two antennas is eliminated, the physical distance requirement between the two antennas is reduced to zero, which greatly improves the space utilization of the electronic device. At the same time, the two antennas provided in the embodiments of the present disclosure can control the working state of different antennas in the dual-antenna, which not only realizes the controllability of the radiation field pattern of the electronic device, but also builds a communication system for electronic devices to send and receive signals through multiple antennas, thereby improving the efficiency of wireless signal transmission.

Embodiments of the present disclosure further provide an application of a dual-antenna electronic device switching method in actual scenarios.

Embodiments of the present disclosure further provide a miniaturized antenna design method and a dual-antenna structure for switching far-field radiation patterns. By adding a connection path (i.e., the decoupling circuit) between the two antennas to decouple them by loading inverted signals, the dual-antenna design is realized in the original antenna space, and the space utilization is greatly improved. Double the number of antennas can be installed in the same space, making it easier to implement 4×4 and large-capacity MIMO communication systems on the electronic device. In addition, the dual-antenna structure has different antenna directions, which can achieve pattern diversity characteristics, and can be used to dynamically adjust the antenna radiation direction. Antenna directions with higher communication quality in any environment can be selected based on signal quality parameters to effectively improve the wireless performance of the electronic device.

Figure 10:
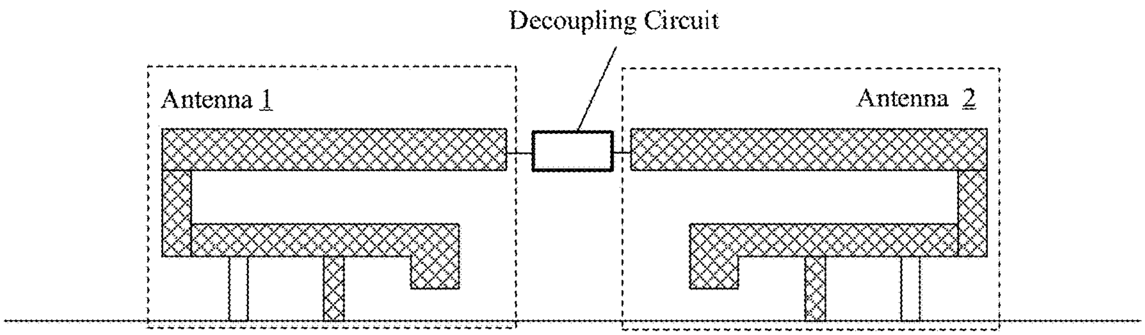
FIG. 10 is a schematic structural diagram of a dual-antenna structure according to an embodiment of the present disclosure.

FIG. 10 is a schematic structural diagram of a dual-antenna structure according to an embodiment of the present disclosure. As shown in FIG. 10, the dual-antenna structure includes antenna 1 and antenna 2. Antenna 1 and antenna 2 may both be inverted F antennas. Antenna 1 and antenna 2 may be designed in the same structural space through mirroring to realize dual-antenna design. The length and size of the inverted F antenna may be optimized. For example, in FIG. 10, the open end of the inverted F antenna is folded up to achieve miniaturization of the antenna. At the same time, a decoupling circuit is used between the open ends of adjacent antennas to optimize the isolation between the two antennas. Therefore, the dual-antenna structure design provided by the embodiments of the present disclosure only has limited increase in the size in the length direction than a single inverted F-shaped antenna, which greatly improves the space utilization and realizes a miniaturized antenna design.

Since the physical distance between the two antennas is much smaller than their operating wavelength, the coupling energy is very strong and there is serious interference between the two antennas. This not only causes isolation between the two antennas, but also affects the impedance characteristics of each antenna. Generally, antennas need to work in multiple frequency bands (e.g., WIFI antennas need to cover 2.4 GHz, 5 GHZ, and 6 GHz frequency bands). In order to minimize the mutual interference between the two antennas, effective isolation of multiple frequency bands is needed. Therefore, in the embodiments of the present disclosure, branch decoupling circuits can be used to cancel the coupling signal between the two antennas in frequency bands.

In some embodiments, when the dual-antenna works in the low frequency band, such as 2.4 GHz, through a decoupling network (i.e., the decoupling circuit) connected by the open ends of the dual-antenna, a directly transmitted inverted signal can be obtained between the two antennas. By changing the parameters of the decoupling network, the inverted signal transmitted by the decoupling network can have the opposite phase and the same amplitude as the spatial coupling signal between the two antennas. Here, opposite phase may refer to a phase difference of 180 degrees to cancel the spatial coupling signal. The parameters of the decoupling network may refer to the high-frequency characteristics of the circuit (such as resistance, inductive reactance, capacitive reactance and delay characteristics), which are used to control the circuit transmission impedance and phase. The inverted signal transmitted through the decoupling network can cancel the coupling signal between the two antennas such that isolation in the low frequency band can be significantly improved.

Figure 11:
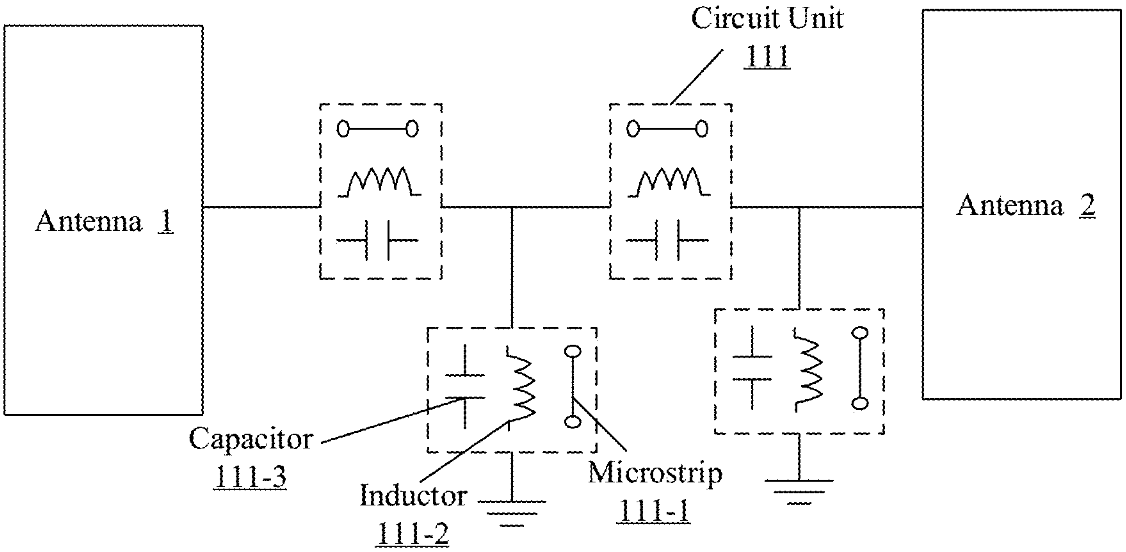
FIG. 11 is a schematic structural diagram of the decoupling circuit according to an embodiment of the present disclosure.

In some embodiments, the decoupling network may include a single reactance (capacitive reactance $X<0$ and inductive reactance $X>0$) or a microstrip for phase adjustment ($X=0$), or a combination of the two for phase adjustments based on needs, and a L/T/x type circuit or single form may be selected based on needs. FIG. 11 is a schematic structural diagram of the decoupling circuit according to an embodiment of the present disclosure. As shown in FIG. 11, the decoupling circuit is composed of a plurality of circuit units 111. Different circuit units 111 may be connected in series or in parallel. Each circuit unit 111 may include a microstrip 111-1, an inductor 111-2, and a capacitor 111-3 connected in parallel, and a control switch (not shown in FIG. 11) connected to the microstrip 111-1, the inductor 111-2, and the capacitor 111-3 respectively. Here, the control switch may be a single-pole three-throw switch, used to select components for connection between the microstrip 111-1, the inductor 111-2, and the capacitor 111-3 based on the current operating frequency band to realize various structures of the decoupling circuit. Each structure may correspond to one of the multiple operating frequency bands. Decoupling circuits with different structures may generate decoupling signals corresponding to the matching operating frequency band to cancel the coupling signal between the first antenna and the second antenna.

Figure 12:
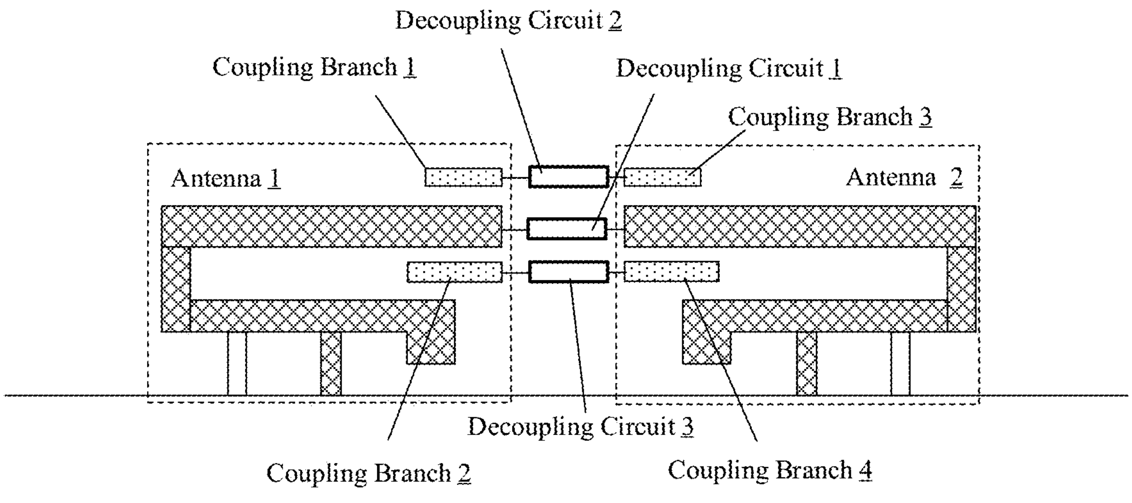
FIG. 12 is a schematic structural diagram of the dual-antenna structure according to an embodiment of the present disclosure.

In the embodiments of the present disclosure, the decoupling network applicable to different frequency bands can only be effective for a certain frequency band and cannot cover all frequency bands of the antenna. Therefore, in order to realize anti-interference optimization in different frequency bands of a multi-frequency antenna, there is a need to obtain direct transmission signals (i.e., the decoupling signals) with different frequency characteristics between the two antennas, and control these direct transmission signals to cancel the coupling signals in different frequency bands, In the embodiments of the present disclosure, coupling branches of different frequencies may be added to the dual-antenna. FIG. 12 is a schematic structural diagram of the dual-antenna structure according to an embodiment of the present disclosure. As shown in FIG. 12, coupling branches (i.e., the first decoupling sub-circuit) are added at the open end of the antenna, such as the coupling branch 1, coupling branch 2, coupling branch 3, and coupling branch 4 in FIG. 12. The coupling branch and the open end of the antenna may not need to be directly connected. For high-frequency signals, coupling will occur between the coupling branch and the open end within a certain distance to achieve signal transmission, and the frequency and amplitude of the signal on the coupling branch may be controlled by changing the distance between the coupling branch and the antenna, and the size/shape of the coupling branch. By controlling the parameters (e.g., the physical characteristics of the coupling branches, such as size, shape, distance, etc. will determine the circuit characteristics of the coupling path, for example, the length of the coupling branches will determine the frequency in a certain program, the distance will affect the amount of coupling signals, and increasing changes in shape can adjust the characteristics at different frequencies) and amount of coupling of the coupling branches, different coupling branches may couple signals in different frequency bands (such as intermediate frequency band and high frequency band). Alternatively, the frequency selection characteristics of different coupling branches may be set through a frequency selection circuit. A circuit network may be added to the connection to control the characteristics of the signal transmitted on the connected branches to cancel the opposite phase of the signal through spatial coupling at the corresponding frequency to eliminate the mutual interference on the corresponding frequency band.

It should be noted that the coupling branch 1 and the coupling branch 4 may have the same shape and size, and the coupling branch 2 and the coupling branch 3 may have the same shape and size. Accordingly, the coupling branch 1 and the coupling branch 4 can be in the same operating frequency band, and the coupling branch 2 and the coupling branch 3 can be in the same operating frequency band.

Consistent with the present disclosure, by adding coupling branches differentiated by frequency to eliminate the multi-band mutual interference between the two antennas, the structure is simple, the circuit characteristics needed for different frequencies can be flexibly adjusted, and operations at the open ends have minimal impact on the antenna characteristics.

In addition, by selecting the feeding point positions (i.e., the feeding units) of antenna 1 and antenna 2, the mutual coupling energy between the two antennas is reduced, the isolation is improved, and the radiation energy is reflected from each other. Accordingly, by changing the radiation filed distribution of the ordinary inverted F-shaped antenna, the dual-antenna can have stronger directivity and complementary directions to achieve pattern diversity. For example, an inverted F antenna (IFA) will have a feed (i.e., the feeding unit) and a ground pin (i.e., the grounding unit). If the feeds of the two antennas are isolated by a ground pin, and the distance between the two feed points (i.e., the point where the feeding unit is connected to the ground structure) is controlled such that the two feed points are at positions near the zero point of the current, the interference between the two antennas can also be reduced.

Figure 13:
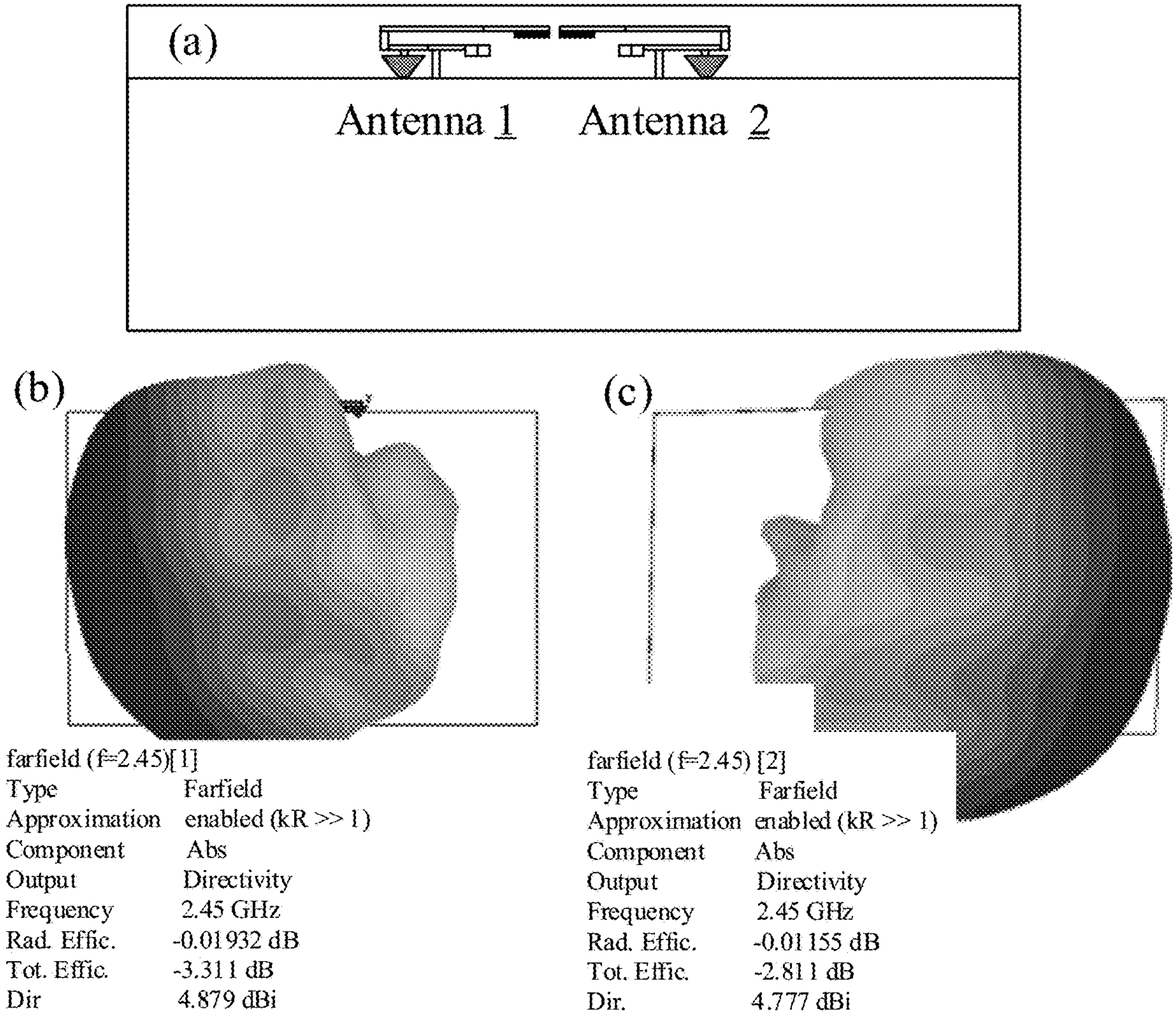
FIG. 13 is a simulation diagram of the dual-antenna structure according to an embodiment of the present disclosure.

FIG. 13 is a simulation diagram of the dual-antenna structure according to an embodiment of the present disclosure. As shown in FIG. 13, Diagram (a) is a schematic diagram of a simulation design of the dual-antenna structure, showing the positional relationship of the dual-antenna structure. Diagram (b) is the radiation field pattern of antenna 1. Diagram (c) is the radiation field pattern of antenna 2. Based on the complementary directivity of the dual-antenna radiation patterns, the performance of the smart antenna system for electronic devices can be greatly improved. In actual communication environments, the appropriate antenna direction can be dynamically adjusted to improv wireless communication performance through switch control.

Figure 14:
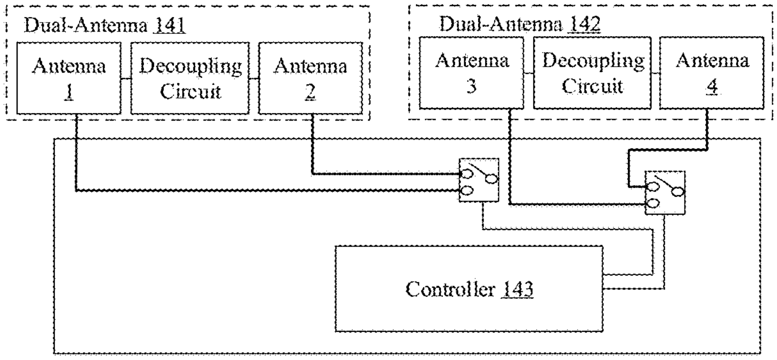
FIG. 14 is a schematic structural diagram of a smart antenna system of an electronic device according to an embodiment of the present disclosure.

FIG. 14 is a schematic structural diagram of a smart antenna system of an electronic device according to an embodiment of the present disclosure. As shown in FIG. 14, the electronic device smart antenna system at least includes two sets of dual-antennas 141 and 142, and a controller 143. The dual-antenna 141 includes an antenna 1 and an antenna 2, and the dual-antenna 142 includes an antenna 3 and an antenna 4. Each set of dual-antenna may have a complementary receiving range. In actual applications, antennas with good performance in the corresponding direction should be selected based on the direction of the signal that needs to be communicated. Wireless communication signals have multipath effects due to environmental factors, and signals may appear in any direction. Therefore, antennas with better receiving and transmitting performance can be selected based on the antenna performance characteristics. Different from the conventional communication through fixed-direction antennas, the flexibility of the antenna and the communication effect are improved. Antenna 1 and antenna 2 may not work at the same time. However, antenna 1 may work with antenna 3 or antenna 4 at the same time, and antenna 2 may also work with antenna 3 or antenna 4 at the same time.

Miniaturized antennas can be realized through the dual-antenna structure provided by the embodiments of the present disclosure. Accordingly, more antennas can be integrated into the original system space, which is beneficial to implement a large-capacity MIMO communication system. In addition, the far-field radiation direction of the antenna in the dual-antenna structure has complementary characteristics. The combination of antennas is also suitable for dynamic control of the radiation direction of the antenna system. By intelligently selecting the antenna direction, the communication performance in actual working environments can be improved.

Consistent with the present disclosure, a miniaturized symmetrical design can be adopted to realize collaborative design of two antennas at the same position, which greatly reduces the size and space needed for antennas and improves the system's ability to integrate more antennas for MIMO application. Through the design of direct connection networks with different characteristics, mutual interference between antennas can be eliminated and the physical distance requirement between antennas can be reduced to zero. In addition, by adding independent coupling branches based on different frequency bands, and carrying out proprietary direction connection network design for different frequencies, the anti-interference of multi-frequency band can be eliminated to realize multi-frequency antenna application solutions. Mirror design can control the coupling and reflection effects and improve the directivity of the radiation field pattern. The two antennas have complementary pointing directions to a certain extent, thereby realizing the function of pattern diversity, making it easy to distinguish and control the point directions of the antennas, and enabling flexible planning or indigent control of the overage direction within the entire range.

In the present disclosure, description with reference to the terms "one embodiment," "some embodiments," "example," "specific example," or "some examples," etc., means that specific features described in connection with the embodiment or example, structure, material or feature is included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, without conflicting each other. In various embodiments of the present disclosure, the size of the sequence numbers of the above-mentioned processes does not mean the sequence of execution, and the execution sequence of each process should be determined by its functions and internal logic, rather than the implementation process of the embodiments of the present disclosure. The above-mentioned serial numbers of the embodiments of the present application are only for description, and do not represent the advantages or disadvantages of the embodiments.

In the present disclosure, the terms "comprising," "including" or any other variation thereof are intended to encompass a non-exclusive inclusion such that a process, method, article or device comprising a list of elements includes not only those elements, but also others not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A dual-antenna electronic device comprising:

a first antenna;

a second antenna; and a decoupling circuit, wherein:

the first antenna and the second antenna have a plurality of operating frequency bands, the decoupling circuit is configured to generate a decoupling signal corresponding to a current operating frequency band based on the current operating frequency band of the first antenna and/or the second antenna to cancel a coupling signal between the first antenna and the second antenna;

a coupling current signal is generated by coupling between the first antenna and the second antenna when one of the first antenna and the second antenna is in a working state, and the decoupling signal is a current signal with the same amplitude and opposite phase of the coupling current signal, to cancel the coupling current signal; and each of an open end of a first radiating unit of the first antenna and an open end of a second radiating unit of the second antenna is folded in half to form a U-shaped radiating unit, and the decoupling circuit is connected to the open end of the first radiating unit and the open end of the second radiating unit.

2. The electronic device of claim 1, wherein:

the first antenna and the second antenna are mirror-symmetrically distributed in the electronic device, and a distance between the first antenna and the second antenna is less than a preset distance.

3. The electronic device of claim 1, wherein:

the decoupling circuit is one of a plurality of decoupling circuits, each matching one of the plurality of operating frequency bands, respectively, wherein:

each of the plurality of decoupling circuits is configured to generate the decoupling signal corresponding to a matching operating frequency band to cancel the coupling signal between the first antenna and the second antenna.

4. The electronic device of claim 1, wherein:

the decoupling circuit includes a first decoupling circuit and a second decoupling circuit, the current operating frequency band includes a first operating frequency band and/or a second operating frequency band, the first operating frequency band being different from the second operating frequency band;

the first decoupling circuit that matches the current first operating frequency band being used to cancel the coupling signal corresponding to the first operating frequency band between the first antenna and the second antenna, and/or the second decoupling circuit that matches the current second operating frequency band being used to cancel the coupling signal corresponding to the second operating frequency band between the first antenna and the second antenna.

5. The electronic device of claim 4, wherein:

the second decoupling circuit includes two first decoupling sub-circuits and a second decoupling sub-circuit, the second decoupling sub-circuit being respectively connected to the two first decoupling sub-circuits, each first decoupling sub-circuit being coupled to the first antenna or the second antenna respectively to generate the coupling signal between the two first decoupling sub-circuits, the second decoupling sub-circuit being used to cancel the coupling signal generated by the second decoupling sub-circuit.

6. The electronic device of claim 1, wherein:

the first antenna includes a first branch and a second branch, and the second antenna includes a third branch and a fourth branch, wherein:

the first branch and the third branch have a third operating frequency band, the second brand and the fourth have a fourth operating frequency band, the third operating frequency band being different from the fourth operating frequency band, and the decoupling circuit is connected to the second branch and the fourth branch respectively.

7. The electronic device of claim 1, wherein:

the electronic device has two sets of dual-antennas, each set of dual-antenna including the first antenna, the second antenna, and the decoupling circuit.

8. The electronic device of claim 7, further comprising:

a controller, the controller being configured to control the first antenna or the second antenna to be in a working state based on signal reception strength of the electronic device and/or signal direction of a wireless signal.

9. The electronic device of claim 1, wherein:

the decoupling circuit is composed of a microstrip, an inductor, and a capacitor connected in parallel; and one of the microstrip, the inductor, and the capacitor is configured to be connected to the first antenna and the second antenna based on the current operating frequency band.

10. The electronic device of claim 1, wherein:

the first antenna is a first inverted F antenna including the first radiating unit, a first feeding unit connected to the first radiating unit, and a first grounding unit connected to the first radiating unit, the second antenna is a second inverted F antenna including the second radiating unit, a second feeding unit connected to the second radiating unit, and a second grounding unit connected to the second radiating unit, the first feeding unit and the second feeding unit are isolated by the first grounding unit and the second grounding unit, and the decoupling circuit is connected between the first radiating unit and the second radiating unit.

11. The electronic device of claim 1, wherein:

the decoupling circuit includes a first decoupling circuit and a second decoupling circuit, the current operating frequency band includes a first operating frequency band and a second operating frequency band different from the first operating frequency band;

the first decoupling circuit that matches the current first operating frequency band being used to cancel the coupling signal corresponding to the first operating frequency band between the first antenna and the second antenna, and the second decoupling circuit that matches the current second operating frequency band being used to cancel the coupling signal corresponding to the second operating frequency band between the first antenna and the second antenna; and the second decoupling circuit is not connected to the first antenna and the second antenna.

12. A decoupling method implemented by a dual-antenna electronic device comprising:

obtaining a current operating frequency band of a first antenna and/or a second antenna in the electronic device; and based on the current operating frequency band, generating, by a decoupling circuit, a decoupling signal corresponding to the current operating frequency band to cancel a coupling signal between the first antenna and the second antenna, wherein:

the first antenna and the second antenna have a plurality of operating frequency bands;

a coupling current signal is generated by coupling between the first antenna and the second antenna when one of the first antenna and the second antenna is in a working state, and the decoupling signal is a current signal with the same amplitude and opposite phase of the coupling current signal, to cancel the coupling current signal; and each of an open end of a first radiating unit of the first antenna and an open end of a second radiating unit of the second antenna is folded in half to form a U-shaped radiating unit, and the decoupling circuit is connected to the open end of the first radiating unit and the open end of the second radiating unit.

13. The method of claim 12, wherein:

the first antenna and the second antenna are mirror-symmetrically distributed in the electronic device, and a distance between the first antenna and the second antenna is less than a preset distance.

14. The method of claim 12, wherein:

the decoupling circuit is one of a plurality of decoupling circuits, each matching one of the plurality of operating frequency bands, respectively, wherein:

each of the plurality of decoupling circuits is configured to generate the decoupling signal corresponding to a matching operating frequency band to cancel the coupling signal between the first antenna and the second antenna.

15. The method of claim 12, wherein:

the decoupling circuit includes a first decoupling circuit and a second decoupling circuit, the current operating frequency band includes a first operating frequency band and/or a second operating frequency band, the first operating frequency band being different from the second operating frequency band;

the first decoupling circuit that matches the current first operating frequency band being used to cancel the coupling signal corresponding to the first operating frequency band between the first antenna and the second antenna, and/or the second decoupling circuit that matches the current second operating frequency band being used to cancel the coupling signal corresponding to the second operating frequency band between the first antenna and the second antenna.

16. The method of claim 15, wherein:

the second decoupling circuit includes two first decoupling sub-circuits and a second decoupling sub-circuit, the second decoupling sub-circuit being respectively connected to the two first decoupling sub-circuits, each first decoupling sub-circuit being coupled to the first antenna or the second antenna respectively to generate the coupling signal between the two first decoupling sub-circuits, the second decoupling sub-circuit being used to cancel the coupling signal generated by the second decoupling sub-circuit.

17. The method of claim 12, wherein:

the first antenna includes at least a first branch and a second branch, and the second antenna includes at least a third branch and a fourth branch, wherein:

the first branch and the third branch have a third operating frequency band, the second brand and the fourth have a fourth operating frequency band, the third operating frequency band being different from the fourth operating frequency band, and the decoupling circuit is connected to the second branch and the fourth branch respectively.

18. The method of claim 12, wherein:

the electronic device has at least two sets of dual-antennas, each set of dual-antenna including the first antenna, the second antenna, and the decoupling circuit.

19. The method of claim 18, further comprising:

controlling the first antenna or the second antenna to be in a working state based on signal reception strength of the electronic device and/or signal direction of a wireless signal.

* * * * *